C. O. ROE.

TRENCH SANDAL.

APPLICATION FILED OCT. 25, 1919.

Reissued Aug. 17, 1920. 14,934.

Inventor
Charles O. Roe
by Zabel & Mueller
Attys.

UNITED STATES PATENT OFFICE.

CHARLES O. ROE, OF INDIANAPOLIS, INDIANA, ASSIGNOR TO ROE METAL SANDAL COMPANY, OF MILWAUKEE, WISCONSIN, A CORPORATION OF WISCONSIN.

TRENCH-SANDAL.

14,934. Specification of Reissued Letters Patent. Reissued Aug. 17, 1920.

Original No. 1,276,964, dated August 27, 1918, Serial No. 197,829, filed October 22, 1917. Application for reissue filed October 25, 1919. Serial No. 333,413.

*To all whom it may concern:*

Be it known that I, CHARLES O. ROE, a citizen of the United States, residing at Indianapolis, in the county of Marion and State of Indiana, have invented certain new and useful Improvements in Trench-Sandals, of which the following is a specification.

This invention relates to sandals to be worn with boots or shoes for trench work in warfare and also in peaceful pursuits when walking over rough, icy and uneven slippery ground.

One of the objects of the invention consists in the provision of a sandal to be worn with boots and shoes which will stand far greater and harder usage than leather; which will give the wearer a firmer footing under all kinds of ground and weather conditions; also preventing the wearer's feet from becoming sore by reason of the soles of the boots and shoes wearing thin, thereby promoting and maintaining a healthier condition of the feet, and also retarding fatigue of the wearers, by maintaining a better equipoise of the body.

A further object of the invention consists in the provision of a sandal wherein worn down spikes in the soles can be easily and readily replaced, thereby prolonging the life and utility of the sandal with a corresponding reduction in cost of replacement and maintenance.

I accomplish the above objects of the invention, and such others as may appear from a perusal of the specification and claims, by means of the construction illustrated in the accompanying drawing, forming a part hereof, in which—

Figure 1:
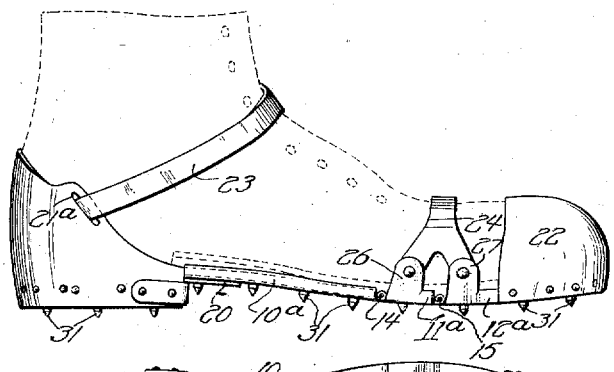
Figure 1 is a side elevation of my improved sandal showing the manner in which the same is held in position on the wearer's foot.
Figure 2:
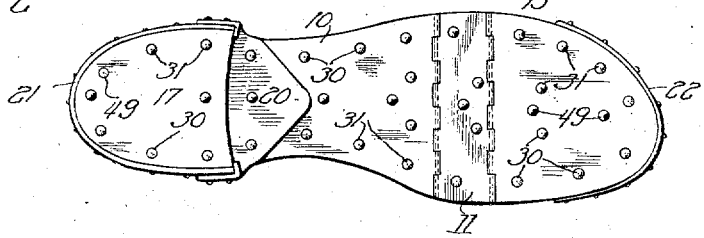
Fig. 2 is an underside plan view of the sandal.
Figure 3:
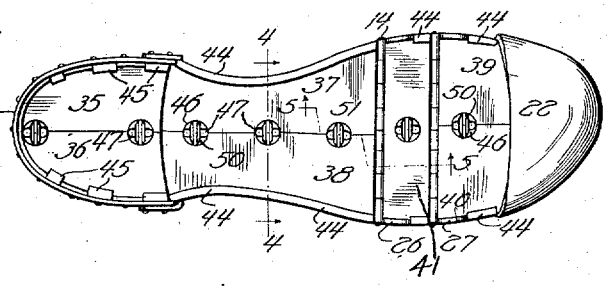
Fig. 3 is a top or plan view of the sandal.
Figure 4:
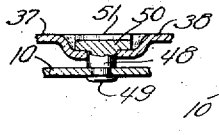
Fig. 4 is a fragmentary detail cross sectional view on an enlarged scale, showing one of the locking devices, on a line 4—4 in Fig. 3.
Figure 5:
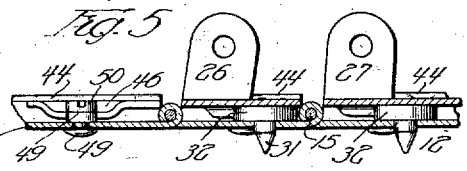
Fig. 5 is a fragmentary detail longitudinal sectional view, on an enlarged scale, showing more clearly the construction and arrangement of the parts.
Figure 7:
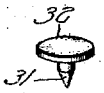
Fig. 7 is a perspective view of one of the spikes, the remaining parts being omitted.
Figure 6:
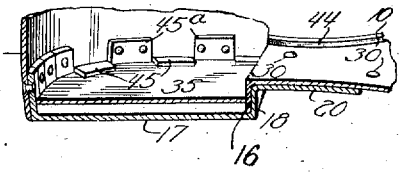
Fig. 6 is a fragmentary detail perspective view, showing the manner in which the counter of the sandal is attached to the sole plate.

Referring to the drawings, the sole and heel of the sandal are preferably composed of thin sheet steel plates to sustain the rough usage to which they are subjected. The sole of the sandal is composed of at least three sections 10, 11 and 12 which have upstanding edges $10^a$, $11^a$, and $12^a$ and are hingedly secured together by means of the hinge-connections 14 and 15. The upstanding edges just referred to are slightly higher than the thickness of the heads 32 and are provided with the inwardly turned hooks 44 whose purpose will later be described. The hinge-connections 14 and 15 extend transversely of the sandal and are located immediately beneath the ball of the foot where the greatest amount of bending occurs, and where the greatest amount of elasticity is required. The free end of section 10 is bent downwardly at right angles to provide an extension 16 which is slightly less than the height of the heel on the shoe, thereby providing some latitude for the wearing down of the heel. Section 17 which forms the heel of the sandal is bent upwardly at one end to form a member 18 which member rests against extension 16, and member 18 is bent at right angles to form a member 20 which rests against the outer surface of the section 10 of the sole, and members 16 and 18, and, also, members 10 and 20 are rigidly secured together by means of suitable rivets, or by spot-welding. This overlapping of sections 10 and 17 reinforces the sandal at its weakest point—where the sole and heel sections join. Heel section 17 is provided along its side and rear portions with upstanding ears or members $45^a$ to which the counter 21 is secured by means of suitable rivets, or by spot-welding. The heel section 17 with its attached members 18, 20 and $45^a$ can be made by a single stamping operation. Section 12 of the sole is provided with a shoe tip 22 which may be riveted or welded thereto, to form a pocket for the toe of the boot or shoe, and the heel section 17 is provided with a counter 21 for holding the boot or shoe in position in the sandal. Counter 21 is provided on opposite sides with a slot 21[a] adapted to receive a strap 23, the latter passing over the instep of the foot and serves to hold the sandal in operative position, on the boot or shoe. In addition to strap 23 I provide a strap 24 which passes over the ball of the foot and engages the ears 26 formed integrally with section 11, and also with the ears 27 formed integrally with section 12 of the sole. The straps 23 and 24 will be provided with ordinary buckles although any suitable attaching means may be used. Heel-section 17 and sole sections 10, 11 and 12 are provided with a plurality of apertures 30, and through these apertures I pass suitable tempered steel spikes 31. Spikes or calks 31 are provided with thin flat heads 32 so as to extend but a short distance above the surface of sections 10, 11, 12 and 17. Spikes 31 are easily removed from apertures 30 when worn down to where their utility is destroyed and may be easily replaced by the introduction of new spikes 31 into apertures 30, thereby making the sandals as effective as when new. Spikes 31 are prevented from backing out or being displaced from apertures 30 by means of suitable plates which are spaced from the sections 10, 11 and 12 a distance equal to the thickness of the heads 32 and rest tightly upon the flat heads of said spikes. To render the plates to be more easily removed and inserted they are preferably divided along their longitudinal centers into two members, in which the sections 35 and 36 are arranged within the heel portion of the sandal; members 37 and 38 being arranged in section 10 of the sole and members 39 and 40 in section 12 of the sole. Section 11 is provided with a single member 41, the latter being narrow and easily sprung upward in the center to remove it, so that this member may be made of a single piece of material. The outer edges of heel-members 35 and 36 are held down into contact with the heads of the underlying spikes 31 by means of the marginal ears 45 which are formed out of the adjacent edges of heel section 17, these ears being bent downwardly to form hooks under which the edges of members 35 and 36 are inserted. The outer edges of members 37, 38, 39, 40 and 41 are held down by the hooks 44 which are formed by up-turning the edges of said plates. The meeting edges of members 35, 36, 37, 38, 39 and 40 have coöperating depressions 46, and the meeting edges in the bottoms of these depressions are provided with notches to form elongated slots 47. Extending through each slot 47 is a locking pin 48, these pins being mounted in sections 10, 11, 12 and 17. Pins 48 are provided on their lower ends with heads 49 to prevent their displacement from said sections, the pins however being free to rotate about their longitudinal axes. The upper end of each pin 48 terminates in a transverse head 50 which projects laterally away from its opposite sides, and each head is provided in its top surface with a kerf 51, adapted to receive the end of a screw-driver, or similar tool, for rotating pins 48 so as to move heads 50 to stand either transversely across the edges to lock the plates or parallel with slots 47 to permit the removal of the plates. When the heads stand transversely across the edges, they retain the edges in contact with each other and effectively prevent the outer edges of the plate members 35, 36, 37, 38, 39 and 40 from slipping out from under the hooks 44. Two pins 48 are used in the heel portion, three in the instep portion and two in the toe portion as will be clear from Figs. 2 and 3. Only one pin is necessary in the plate 41 as the plate is narrow and is formed of a single piece of metal.

By means of the herein described construction, the plates may be easily unlocked and taken out for the removal and replacement of the spikes or calks 31, when the latter have become sufficiently worn to be unfit for further service.

Having thus fully described my said invention, what I desire to secure by Letters Patent is:

1. A sandal of the herein described class comprising a sole-member composed of a plurality of hingedly connected sections containing a plurality of perforations, spikes passing through said perforations, means formed along the edges of said sole-member for securing the marginal edges of a spike-retaining means, a spike-retaining means adapted to be inserted under the preceding means and resting upon the upper ends of the spikes for holding the latter in operative position, and means for locking said spike-retaining means in operative position.

2. A sandal of the herein described class comprising a sole-member composed of a plurality of hingedly connected sections containing a plurality of perforations, a heel-member attached to the adjacent sole-section and provided with perforations and slidable therein, spikes passing through said perforations, retaining-means for holding the spikes in operative position, and means for locking said retaining-means in operative position.

3. A sandal of the herein described class comprising a sole-member composed of a plurality of hingedly connected sections containing a plurality of perforations, a heel-member provided with perforations attached to the adjacent sole-section, spikes passing through said perforations, spike-retaining means for holding the spikes in operative position, means arranged along the outer edges of the heel and sole members for securing the marginal edges of the spike-retaining means in operative position, a spike-retaining means, and means for locking the spike-retaining means in operative position.

4. A sandal of the herein described class comprising a sole-member composed of a plurality of hingedly connected sections containing a plurality of perforations, spikes passing through said perforations, spike retaining means for holding said spikes in operative position and provided with slots, pins arranged in said sole-member and extending through said slots, transverse heads on said pins for locking the spike retaining means, when the heads stand transversely of said slots, and means for securing the marginal edges of said spike-retaining means in operative position.

5. A sandal of the character described comprising two or more pivotally united sections, means whereby said sandal is adapted for attachment upon the foot of the wearer exteriorly of the shoe, calks slidably and removably mounted in said sections, and readily freed and insertible retaining means for holding said calks in operative position.

6. A sandal of the character described comprising two or more pivotally connected sections, means to attach said sections to the exterior of the shoe of the wearer, calks mounted in said sections and readily removable therefrom by sliding them inwardly, plates to retain said calks in operative position in said sections and against such inward movement, and means to detachably secure the plates to the sections.

7. A sandal of the character described comprising two or more yieldingly united metallic sections, means whereby said sandal is adapted for attachment upon the foot of the wearer exteriorly of the shoe, calks, spikes or the like removably and slidably mounted in said sections, and readily removable means which conjointly hold a plurality of calks, spikes or the like in operative position.

8. A sandal of the character described comprising two or more yieldingly united sections, a heel portion connected to one of said sections, means for attaching the sandal to the foot of the wearer exteriorly of the shoe, spikes or calks removably and slidably mounted in said sections and heel portion, and readily removable retaining means for holding said spikes or calks in operative position.

9. A sandal of the character described comprising two or more yieldingly united sections, a heel portion connected to one of said sections, means for attaching the sandal to the foot of the wearer exteriorly of the shoe, headed spikes or calks removably mounted in said sections and heel portion said spikes or calks being removable by an endwise sliding movement, and readily removable retaining means for holding said spikes or calks in operative position by engagement with the heads on said spikes or calks, there being separate retaining means for each section and the heel portion.

10. A sandal of the character described comprising two or more yieldingly united sections, a heel portion connected to one of said sections, means for attaching the sandal to the foot of the wearer exteriorly of the shoe, readily removable spikes or calks slidably mounted in said sections and heel portion, and readily removable retaining means for holding said spikes or calks in operative position, there being separate retaining means for each section and the heel portion, and each retaining means acting to retain a plurality of spikes or calks in position.

11. A sandal of the character described comprising two or more yieldingly united sections, a heel portion having a member rigidly secured to one of said sections for reinforcing said one section, means whereby said sandal may be attached to the foot of the wearer exteriorly of the shoe, spikes or calks mounted in said sections and readily removable by a sliding movement thereof and readily freed and insertible means for retaining the spikes or calks in operative position.

12. A sandal of the character described comprising two or more pivotally connected sections, a heel portion having a member rigidly secured to one of said sections for reinforcing said one section, means whereby said sandal may be attached to the foot of the wearer exteriorly of the shoe, spikes or calks mounted in said sections and readily removable by a sliding movement thereof and readily freed and insertible plates for retaining the spikes or calks in operative position.

13. A sandal of the character described comprising two or more yieldingly united perforated metallic sections, a perforated heel portion connected to one of said sections, means for attaching the sandal to the foot of the wearer exteriorly of the shoe, headed calks projecting through the perforations in said sections and heel portion and readily removable therefrom by a sliding movement and readily removable means for retaining the calks in position in said perforations by engagement with the heads thereof.

14. A sandal of the character described comprising yieldingly united sections provided with perforations, headed calks adapted to be positioned in said perforations by a sliding movement thereof, plates insertible in said sections, and adapted to retain the calks in said perforations by engagement with said heads and readily releasable means for detachably securing the plates to the sections.

15. A sandal of the character described comprising a plurality of pivotally connected perforated metallic sections, a perforated heel portion connected to one of said sections, means for attaching the sandal to the foot of the wearer exteriorly of the shoe, headed calks removably mounted in and projecting through the perforations in said sections and heel portion, and readily removable means for retaining the calks in position in said perforations said means comprising a plurality of slotted plates inwardly of the heads of said calks, and means for locking said plates in position comprising pins with transverse heads movable into and out of parallelism with slots in said plates.

16. A sandal of the character described comprising a plurality of yieldingly connected perforated metallic sections, means for attaching the sandal to the foot of the wearer exteriorly of the shoe, headed calks readily removably mounted in and projecting through the perforations in said sections, said calks being removed by a simple sliding movement thereof, and readily removable retaining means for retaining the calks in position, said means comprising a plurality of plates slidable into position inwardly of the heads of the calks to thereby hold the same.

In witness wherof, I hereunto subscribe my name this 1st day of October, A. D., 1919.

CHARLES O. ROE.